United States Patent
Uhlhorn et al.

(10) Patent No.: US 7,334,944 B1
(45) Date of Patent: Feb. 26, 2008

(54) OPTICAL CONNECTOR

(75) Inventors: Brian L. Uhlhorn, St. Paul, MN (US); Gregory M. Drexler, Minnetonka, MN (US); Gregory J. Whaley, Woodbury, MN (US); Ryan L. Nelson, Farmington, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/491,845

(22) Filed: Jul. 24, 2006

(51) Int. Cl.
*G02B 6/38* (2006.01)

(52) U.S. Cl. ............................. 385/74; 385/56; 385/73

(58) Field of Classification Search ..................... None
See application file for complete search history.

(56) References Cited

U.S. PATENT DOCUMENTS

| | | | |
|---|---|---|---|
| 4,896,938 A | 1/1990 | Mathis et al. | |
| 4,934,785 A | 6/1990 | Mathis et al. | |
| 5,257,332 A | 10/1993 | Pimpinella | |
| 5,481,634 A | 1/1996 | Anderson et al. | |
| 5,495,545 A * | 2/1996 | Cina et al. | 385/92 |
| 5,631,986 A | 5/1997 | Frey et al. | |
| 6,623,174 B2 | 9/2003 | Perko et al. | |
| 6,736,547 B2 | 5/2004 | Stevens et al. | |
| 6,758,603 B2 | 7/2004 | Yang | |
| 6,862,397 B2 | 3/2005 | Harres et al. | |
| 6,899,464 B2 | 5/2005 | Stevens et al. | |
| 7,066,656 B2 | 6/2006 | Demissy et al. | |
| 2003/0021543 A1* | 1/2003 | Mann et al. | 385/74 |
| 2003/0231831 A1* | 12/2003 | Yamamoto et al. | 385/39 |
| 2004/0105626 A1* | 6/2004 | Gallup et al. | 385/88 |

* cited by examiner

*Primary Examiner*—Tina M. Wong
(74) *Attorney, Agent, or Firm*—Brooks, Cameron & Huebsch, PLLC

(57) ABSTRACT

In one example embodiment, an optical connector arrangement includes a coupler with a first part and a second part each having a first end to receive an optical fiber core and a second end that releasably couples the first part and the second part. An insert block having a connector face and an assembly face is included in each of the first part and the second part. The connector face has a lens assembly to optically couple the optical fiber core of the first part and the second part, and the assembly face has an axial passageway that terminates in the assembly face and aligns with the first end to receive an end portion of the optical fiber core.

20 Claims, 4 Drawing Sheets

OPTICAL CONNECTOR

TECHNICAL FIELD

The present disclosure generally relates to connectors. And, in particular, the present disclosure relates to a connector for optical communication systems, and other such fields.

BACKGROUND

Optical fiber connectors form part of many optical fiber communication systems. Optical fiber connectors have various functions. For example, one function can be the alignment of two optical fiber ends such that the core of one of the fibers is axially aligned with the core of the other fiber to allow substantially all of the light from one fiber to be coupled into the other fiber. This is a particularly challenging task because the light-carrying region (core) of an optical fiber is very small. Another function of an optical connector is to provide mechanical stability at the junction between the two optical fibers. The optical fiber connectors can also provide protection to the junction in its working environment.

Achieving low insertion loss at the coupling of two fibers is generally a function of the alignment of the fiber ends, the distance of the gap between the ends, and the optical surface condition of either or both ends. Stability and junction protection are generally a function of connector design. For example, minimization of the thermal expansion and mechanical movement effects are two characteristics that can be changed based upon connector design.

Optical fiber data links are becoming more common in many applications. For example, multimode fiber optic links are utilized in military avionic systems. In some instances, multimode optical data links are limited in their communication speed, can create a larger foot print, and can be limited in the network they can support. Single mode optical fiber has the potential to overcome these limitations. However, single-mode optical connectors can be more difficult to maintain as compared to multi-mode connectors typically because the single mode fiber core diameter is smaller.

For example, a multimode fiber is typically manufactured with a core diameter of fifty (50) micrometers (μm), sixty-two and one half (62.5) μm, or larger. On the other hand, a single-mode fiber is manufactured with a core diameter in the range of eight (8) μm to ten (10) μm.

A further consideration is the complexity of field installation of an optical fiber connector. Installation complexity can result in technicians needing extra training and/or specialized tools. Complexity can also increase system down time due to the need for specialized parts to accomplish the installation and/or replacement of connectors. In addition, the complexity of field installation can limit the ability to install and/or repair a connector in the field.

SUMMARY

Embodiments of the present disclosure include optical connector devices, methods, and systems. The connectors can assume a variety of forms, including the form of single channel and multi-channel connectors. Such embodiments can be useful for connecting single mode fiber as well as for connecting multimode fiber. Further, embodiments of the present disclosure can be used in other fiber optic devices, e.g., a variable attenuator, a fiber-to-fiber switch, or an in-line optical fiber.

In various embodiments, an optical connector includes a coupler with a first part and a second part each having a first end to receive an optical fiber and a second end that releasably couples the first part and the second part. In addition, an insert block having a connector face and an assembly face is included in each of the first and second parts.

In such embodiments, the connector face may include a lens assembly to optically couple the optical fiber of the first part and the second part. The assembly face has an axial passageway that terminates in the assembly face and aligns with the first end of the coupler to receive an end portion of the optical fiber.

Embodiments of the present disclosure also include various methods of manufacturing an optical connector. In such embodiments, the methods can include forming a coupler with a first part and a second part having a first end to receive an optical fiber and a second end that releasably couples the first part and the second part.

An insert block can be formed having a connector face and an assembly face. In such embodiments, a lens assembly can be inserted into the connector face and an axial passageway can be formed that terminates in the assembly face and aligns with the first end to receive an end portion of the optical fiber. The insert blocks can be inserted into each of the first part and the second part of the coupler.

In embodiments for fiber optic systems utilizing a transmitter and a receiver, an optical connector can be used to couple the transmitter and the receiver. In such embodiments, the optical connector would include a coupler with a first part and a second part, each having a first end to receive an optical fiber and a second end that releasably couples the first part and second part.

In some embodiments, the connector includes an insert block having a connector face and an assembly face in each of the first part and the second part. The connector face can include a lens assembly to optically couple the optical fiber of the first part and the second part, and the assembly face can include an axial passageway that terminates in the assembly face and aligns with the first end to receive an end portion of the optical fiber.

In various embodiments, the optical connector has a connector face that includes a guide pin and a guide pin receiver to align the insert blocks in each of the first and second parts of the coupler. Also, in various embodiments, the connector face defines a rim outlining the connector face to maintain a spacing between the insert blocks in each of the first part and second part. In some embodiments, the connector face is a continuous, planar face to facilitate easy cleaning. The lens assembly in the connector face can be an expanded beam lens assembly.

Various embodiments of the present disclosure present an optical connector with a larger beam diameter of an expanded beam to make the connection less susceptible to the effects of dirt and debris. In some embodiments, a rim can be provided on the connector face to maintain a spacing between the insert blocks.

DETAILED DESCRIPTION

Figure 1:
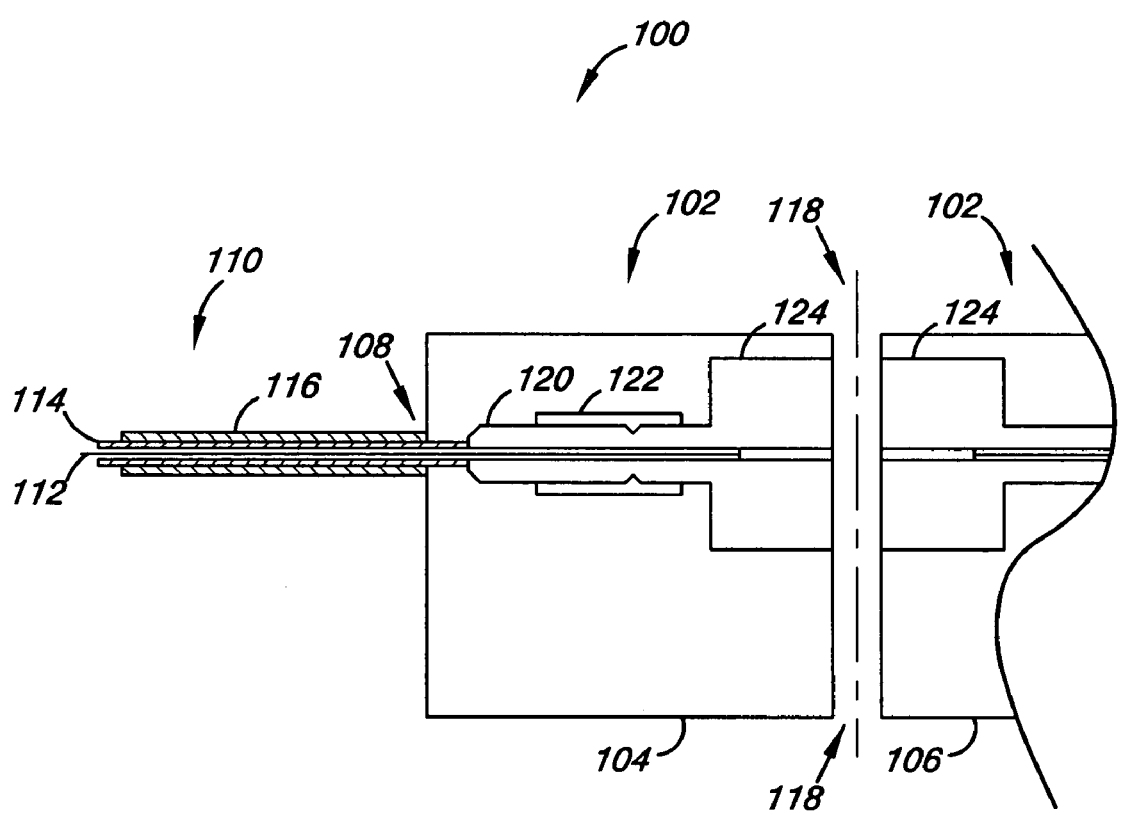
FIG. 1 illustrates a perspective view of an optical connector according to an embodiment of the present disclosure.

The present disclosure includes a number of device, method, and system embodiments for optical fiber connectors. Embodiments of the present disclosure will now be described in relation to the accompanying drawings, which will at least assist in illustrating the various features of the various embodiments.

In the Figures, the first digit of a reference number refers to the Figure in which it is used (e.g., FIG. 1 utilizes numbers in the 100s), while the remaining two digits of the reference number refer to the same or equivalent parts of embodiment(s) of the present disclosure used throughout the several figures of the drawing.

The scaling of the figures does not represent precise dimensions and/or dimensional ratios of the various elements illustrated herein. In addition, the shapes and materials that can be used can encompass innumerable variations, which may depend, for example, on application requirements.

FIG. 1 illustrates a perspective view of an optical connector according to an embodiment of the present disclosure. As used herein, the term "connector" means an apparatus which allows connection, disconnection, and/or reconnection of two optical fiber cores or of an optical fiber core and an optical device. As illustrated, the embodiment of FIG. 1 includes the optical connector 100 having a coupler 102 with a first part 104 and a second part 106.

Coupler 102 may be a number of different types of optical fiber connectors. Examples of suitable connector types include ST®, SC, FC, D4, or FDDI, connectors, among others. In one embodiment, the coupler 102 can be a 38999 type connector where the first part 104 is a 38999 socket and the second part 106 is a 38999 plug.

In the embodiment of FIG. 1, the first part 104 and second part 106 have a first end 108 to receive a fiber optic cable 110. Although the optical connector 100, is illustrated as receiving one fiber optic cable 110, it is to be understood that multiple ports could be incorporated into the optical connector 100 to facilitate the connection of more than one fiber optic cable 110 at one time.

The fiber optic cable 110 of FIG. 1 includes an optical fiber core 112, cladding 114, and buffer/outer jacket 116. The core 112 is typically a strand of glass or other wavelength transparent material and is carried through the cable 110 by way of the cladding 114.

The cladding 114 can also be made of glass or other wavelength transparent material but may have a slightly lower index of refraction than the core 112. For example, in some cables the indexes of refraction can be within 1-2%. Thus, if the signal injected into the core 112 strikes cladding 114 the signal is reflected back into the core 112 so as to continue down the cable 110.

The jacket 116 can be utilized as a shock absorber to protect core 112 and cladding 114 from shocks that might affect their physical properties. Further, jacket 116 can protect the cable 110 from abrasions, solvents, and/or other damaging elements. In many embodiments, jacket 116 does not have any optical properties that would affect the propagation of the signal within the cable 110.

As discussed herein, in various embodiments the optical fiber core can be a single-mode fiber. In some embodiments, the optical fiber core can have a cylindrical core or a non-cylindrical core.

The optical fiber core can be made from several different materials. For example, the optical fiber core can be made from silica, fluorozirconate, fluoraluminate, or chalcogenide, among other materials In the embodiment of FIG. 1, the first part 104 and the second part 106 of the coupler 102 have a second end 118 that releasably couples the first part 104 and the second part 106. The coupler 102 may be made of several different materials. For example, in some embodiments, the coupler can be made of glass or other wavelength transparent material.

In some embodiments, the optical connector can include a ferrule 120. Ferrules can be used to align, hold, and/or protect the ends of optical fiber cores at the point of connection or termination.

Ferrules can be made from materials having a low coefficient of thermal expansion, high elastic modulus, and/or high hardness. For example, ferrules can be made of glass, plastic, metal, and/or ceramic material.

In some embodiments, the ferrule can be bored through the center at a diameter that is larger than the diameter of the cladding. In various embodiments, such as that illustrated in FIG. 1, the end of an optical fiber core 112 can be located at the end of the ferrule 120.

In some embodiments, the connector can use a ferrule having a physical contact (PC) finish. A PC-finished ferrule typically has a radiused (e.g., convex) contact surface. The contact surface of the ferrule is the surface at which the terminal end of the optical fiber core is located and which is brought into contact with another contact surface, as discussed herein.

In some embodiments, such as that illustrated in FIG. 1, the optical connector 100 can include a connector body 122. In such embodiments, the connector body can hold the ferrule 120. The connector body can be constructed of metal and/or plastic, among other materials. In addition, the connector body 122 can include a biasing force, such as a spring, for biasing the ferrule against a desired external surface to make an optical connection.

Figure 2A:
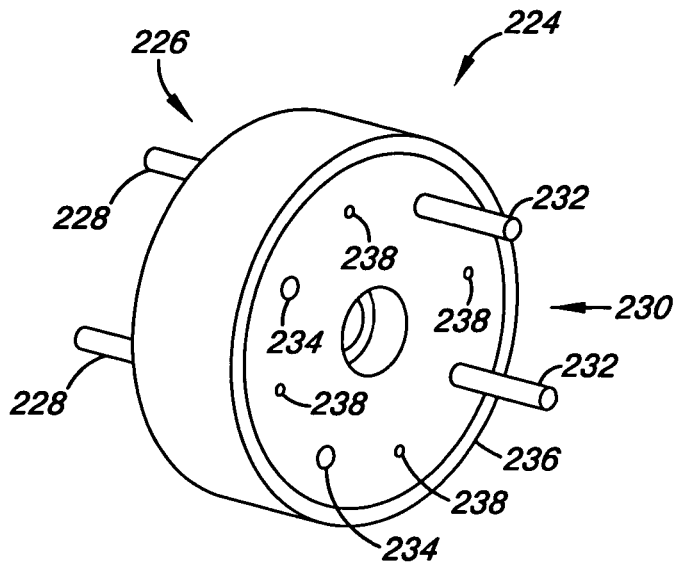
FIG. 2A illustrates an insert block according to an embodiment of the present disclosure.

In various embodiments, a ferrule can be mated to an insert block inside each of the first part and the second part. FIG. 2A illustrates an insert block according to an embodiment of the present disclosure.

In the embodiments of FIG. 2A, the insert block 224 includes an assembly face 226 which can include a number of axial passageways 228. In such embodiments, the contact surface of a ferrule can be inserted into the axial passageway 228. As discussed herein, the ferrule can be used to align and hold the ends of optical fiber cores at the point of connection. As such, in embodiments where the ferrule is inserted into the axial passageway 228, the terminal end of the optical fiber core can contact, couple to, or be guided to a lens located within the insert block 224, as discussed herein.

In addition, in some embodiments the axial passageways 228 can be aligned with the first end of the first and second parts of the coupler to prevent bending of the optical fiber core once the optical fiber core is inside the optical connector, among other benefits.

As shown in FIG. 2A, in some embodiments, the insert block 224 can include a connector face 230. In such embodiments, the connector face 230 includes a number of guide pins 232 and/or a guide pin receivers 234 to align the insert block 224 with a second symmetric insert block 224, as discussed herein.

In various embodiments, in addition to or at the exclusion of a guide pin and guide pin receiver, the connector face 230 can include a mechanism to lock two symmetric insert blocks together. For example, the connector face can include a member with a spherical shaped end that releasably engages a receiver, shaped like a socket, among other suitable alignment and/or locking mechanisms.

In some embodiments, the connector face 230 can include a lens assembly. As used herein, a "lens assembly" refers to the lens 238 in the connector face 230 and the components used to keep the lens 238 in place.

In some embodiments, the lens 238 of the lens assembly can be a Gradient Index (GRIN) lens. In such embodiments, the GRIN lens can be used to focus and collimate light through a radial variation of the lens material's index of refraction from the optical axis to the edge of the lens.

In this way, a GRIN lens, for example, with flat or angled polished surfaces, can collimate light emitted from an optical fiber core or can focus an incident beam into an optical fiber core. In addition, end faces of the lens 238 can be provided with an anti-reflection coating to avoid back reflection.

In various embodiments, the GRIN lens can be a GRIN lens (e.g., a two (2) millimeter (mm) diameter lens) and ferrule assembly affixed on the end of the fiber. In some embodiments, a fixed focus aspheric lens assembly (e.g., a six (6) mm diameter lens) can be used. Also, in various embodiments, a micro-alignable fixture with a focusable achromatic lens (e.g., an eighteen (18) mm aperture) can be used as the lens assembly. In some embodiments, large aperture catadioptric systems for collecting light from weak, distended, or distant sources can be used as the lens assembly.

In some embodiments, the lens allows the optical fiber in the first part to optically couple with the optical fiber in the second part when the coupler is coupled. When the first part and second part are coupled, the lens in each of the insert blocks can create an expanded beam lens assembly, as discussed herein.

As illustrated in FIG. 2A, in some embodiments, the connector face 230 can be relatively continuous and planar to facilitate cleaning. In such embodiments, when the optical connector is being used in outdoor environments where the connector may be susceptible to dirt and debris, special cleaning tools may not have to be used.

Figure 2B:
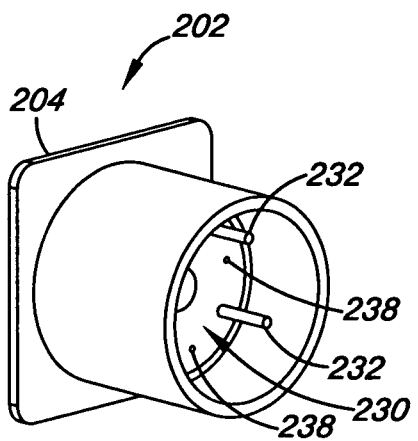
FIGS. 2B-2C illustrate an insert block inside a coupler according to an embodiment of the present disclosure.
Figure 2C:
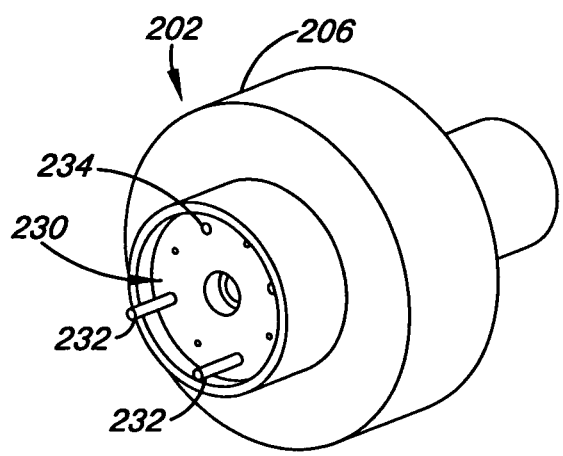

FIGS. 2B-2C illustrate an insert block 224 according to embodiments of the present disclosure inside a coupler 202. FIG. 2B illustrates an embodiment of an insert block 224 inside a first part of a coupler 202. As illustrated, in some embodiments, the first part 204 of a coupler 202 can be a socket.

In addition, FIG. 2C illustrates an embodiment of an insert block 224 inside a second part 206 of a coupler 202. As illustrated, in some embodiments, the second part 206 of a coupler 202 can be a plug. As discussed herein, the first part 204 can couple with the second part 206 to optically couple two optical fiber cores located in each of the first part 204 and second part 206.

In some embodiments, when the second part 206 is inserted into the first part 204, effectively coupling the coupler, the connector face 230 of the insert block 224 in the first part 204 can be adjacent to the connector face 230 of the insert block 224 in the second part 206. In those embodiments where the connector faces 230 of each insert block 224 are adjacent to one another, the signal being transmitted by the optical fiber core can be transmitted, via the lens assembly in each insert block 224, from the optical fiber core in the first part 204 to the optical fiber core in the second part 206 when the first part 204 is connected to a transmitter and the second part 206 is connected to a receiver, as discussed herein.

In various embodiments, the insert blocks can be spaced apart from each other. In this way, damage from dirt and debris can be reduced in some situations.

For example, in some embodiments, the connector face 230 of the insert block 224 can define a rim 236 outlining the connector face 230. In such embodiments, the rim 236 can be formed such that when the optical connector coupler 202 is coupled, the rim 236 of the insert block 224 in the first part 204 abuts the rim 236 of the insert block 224 in the second part 206.

The presence of the rim 236, in these embodiments, can allow a space to be maintained between the insert blocks 224 in each of the first and second parts 204, 206. By providing embodiments where the connector face 230 includes a rim 236, an expanded beam lens assembly is formed when the first part 204 can be coupled to the second part 206.

As discussed herein, in some embodiments such as the embodiment illustrated in FIG. 2, the insert block 224 can include a number of axial passageways 228 where a ferrule can be inserted to connect the optical fiber core to the lens 238 inside of each insert block 224. In such embodiments, the internal mating of the terminal end of the optical fiber and the lens 238 can remain intact while mating and de-mating the first part 204 and second part 206 of the coupler 202. In this way, in these embodiments, the connection between the fiber and the insert block does not necessarily require cleaning after the initial installation.

In addition, in some embodiments, the insert block can be designed to accept different common PC termini on each of the first part and second part to provide for compatibility between different coupler halves if a different type of physical contact terminus is provided.

Figure 3:
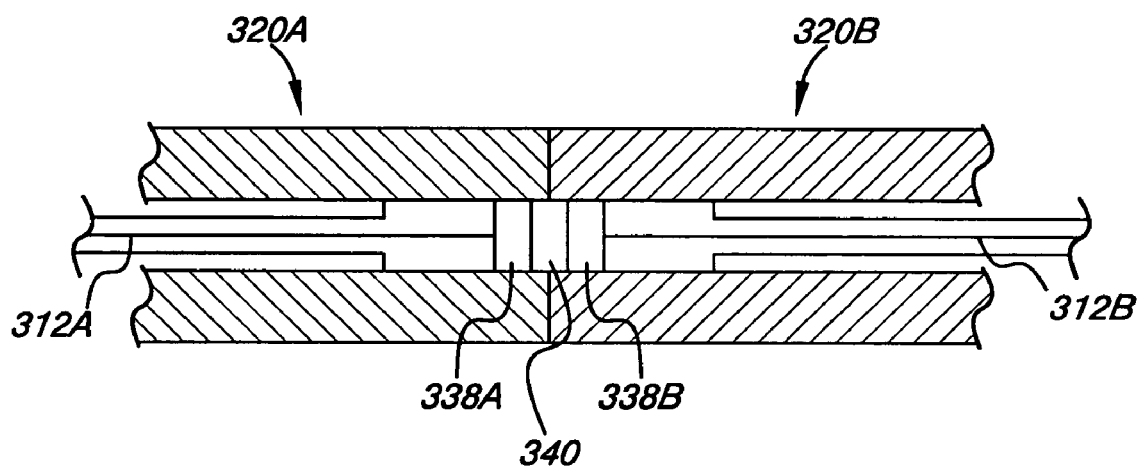
FIG. 3 illustrates an expanded beam lens assembly according to an embodiment of the present disclosure.

FIG. 3 illustrates an expanded beam lens assembly according to an embodiment of the present disclosure. In some embodiments, the expanded-beam arrangement includes a first lens 338A coupled to optical fiber core 312A and a second lens 338B coupled to an optical fiber core 312B.

In the expanded-beam coupling arrangement of FIG. 3, lens 338A receives a light beam from optical fiber core 312A disposed within ferrule 320A and expands the beam to a larger diameter. The expanded-beam travels within an air gap 340 and is received by lens 338B, which is similarly configured. Lens 338B receives the expanded beam and refocuses it to optical fiber core 312B held within ferrule 320B.

Although the air gap 340 is illustrated as a gap caused by the ferrules 320A and 320B in FIG. 3, in some embodiments, a rim included on the connector face of the insert block in each of the first part and second part of the coupler, as discussed herein, can provide an air gap 340 for the expanded beam lens assembly. In addition, the larger beam diameter of the expanded beam can make the connection of the first part and second part of the coupler less susceptible to the effects of dirt and debris. This is because any dirt and debris would be a smaller fraction of the overall beam size, thereby reducing the optical loss. Also, a physical contact would not be needed at this interface, thereby reducing the possibility of dirt and debris impacting or scratching the connector face and/or the lens in the insert blocks provided in the first part and second part of the coupler.

Figure 4:
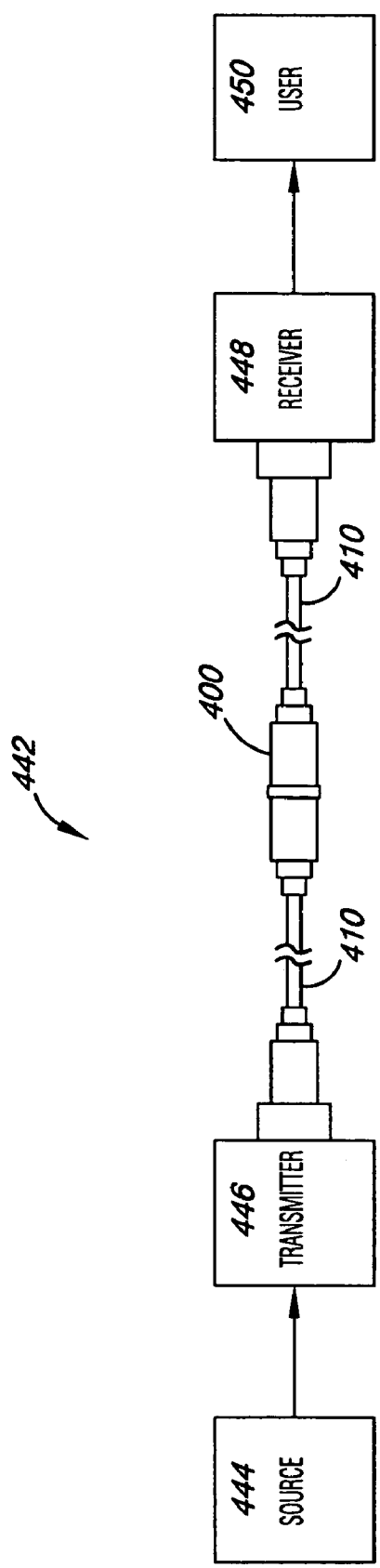
FIG. 4 illustrates a block diagram of a fiber optic system according to an embodiment of the present disclosure.

FIG. 4 illustrates a block diagram of a fiber optic system according to an embodiment of the present disclosure. The system 442 includes a source 444, a transmitter 446, one or more fiber optic cables 410, a receiver 448, and an end user 450. Source 444 provides data to the transmitter 446 in the form of a digital electrical signal.

The transmitter 446 acts as a transducer and converts the digital electrical signal into an optical signal through the fiber optic cable 410. The transmitter modulates the light so as to represent the binary data it receives from the source 444.

The receiver 448 can detect light from the fiber optic cable 410 and then convert the light into an electric signal. Receiver 448 can demodulate this light to determine the data that it represents. The receiver 448 can transmit the binary data to the user 450 in the form of an electrical signal. In some embodiments, the fiber optic cable 410 is mated to the transmitter 446 and receiver 448 by optical connectors 400 of the present disclosure.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. An optical connector, comprising:
   a coupler with a first part and a second part each having a first end to receive a optical fiber core and a second end that releasably couples the first part and the second part;
   a removable insert block having a connector face and an assembly face in each of the first part and the second part, where:
   the connector face has a lens assembly to optically couple the optical fiber core of the first part and the second part, wherein the lens assembly includes a lens formed integrally within the removable insert block; and
   the assembly face has an axial passageway that terminates in the assembly face and aligns with the first end to receive an end portion of the optical fiber core.

2. The optical connector of claim 1, wherein the connector face includes a guide pin and a guide pin receiver to align the insert blocks in each of the first and second part.

3. The optical connector of claim 1, wherein the connector face defines a rim outlining the connector face to maintain a spacing between the insert blocks in each of the first and second part.

4. The optical connector of claim 1, wherein the lens assembly is an expanded beam lens assembly.

5. The optical connector of claim 1, wherein the connector face is a continuous planar face.

6. The optical connector of claim 1, wherein the insert block and the lens assembly are formed of the same material.

7. The optical connector of claim 1, wherein the optical connector has an insertion loss of less than approximately 0.75 dB.

8. The optical connector of claim 1, wherein the coupler is formed of glass.

9. The optical connector of claim 1, wherein the optical connector has a return loss greater than approximately thirty-five (35) dB.

10. A method of manufacture, comprising:
    forming a coupler with a first part and a second part having a first end to receive an optical fiber core and a second end that releasably couples the first part and the second part;
    forming a removable insert block having a connector face and an assembly face including:
    inserting a lens assembly into the connector face, wherein the lens assembly includes a lens formed integrally within the removable insert block; and
    forming an axial passageway that terminates in the assembly face and aligns with the first end to receive an end portion of the optical fiber core; and
    inserting the insert block in each of the first part and the second part.

11. The method of claim 10, wherein forming an insert block having a connector face and an assembly face includes forming a continuous, planar connector face.

12. The method of claim 10, wherein forming an insert block having a connector face and an assembly face includes forming a guide pin and a guide pin receiver on the connector face.

13. The method of claim 12, further including forming a rim on the connector face.

14. The method of claim 10, wherein inserting a lens assembly includes inserting an expanded beam lens assembly.

15. A fiber optic system, comprising:
    a transmitter;
    a receiver; and
    an optical connector coupling the transmitter and the receiver, the optical connector including:
    a coupler with a first part and a second part each having a first end to receive an optical fiber core and a second end that releasably couples the first part and the second part;
    a removable insert block having a connector face and an assembly face in each of the first part and the second part, where:
    the connector face has a lens assembly to optically couple the optical fiber core of the first part and the second part, wherein the lens assembly includes a lens formed integrally within the removable insert block; and the assembly face has an axial passageway that terminates in the assembly face and aligns with the first end to receive an end portion of the optical fiber core.

16. The fiber optic system of claim 15, wherein the connector face is a continuous planar face.

17. The fiber optic system of claim 16, wherein the lens assembly is an expanded beam lens assembly.

18. The fiber optic system of claim 15, wherein the insert block and the lens assembly are formed of the same material.

19. The fiber optic system of claim 15, wherein the connector face includes a guide pin and a guide pin receiver to align the insert blocks in each of the first and second part.

20. The fiber optic system of claim 15, wherein the connector face defines a rim outlining the connector face to maintain a spacing between the insert blocks in each of the first and second part.

* * * * *